United States Patent [19]

Hansen et al.

[11] 4,024,691

[45] May 24, 1977

[54] CORNER KEY REINFORCEMENT BRACE

[75] Inventors: Barton G. Hansen, Cheektowaga; Charles P. Goetz, Kenmore; John A. Gasper, Hamburg, all of N.Y.

[73] Assignee: Roblin Industries, Inc., Buffalo, N.Y.

[22] Filed: June 6, 1975

[21] Appl. No.: 584,480

[52] U.S. Cl. .................................. 52/656; 52/726; 52/731; 403/402
[51] Int. Cl.² .......................................... E04C 2/38
[58] Field of Search .............. 52/656, 657, 758 H; 160/381; 403/295, 401

[56] References Cited
UNITED STATES PATENTS

| | | | |
|---|---|---|---|
| 898,751 | 9/1908 | Krantz | 52/758 H |
| 2,544,512 | 3/1951 | Scruggs | 160/381 |
| 2,767,814 | 10/1956 | Johnson | 52/758 H |
| 2,884,669 | 5/1959 | Hillson | 52/758 H |
| 3,304,108 | 2/1967 | Hamilton et al. | 52/656 X |
| 3,374,597 | 3/1968 | Whitener | 52/656 |
| 3,574,378 | 4/1971 | Heywood | 52/656 X |
| 3,642,310 | 2/1972 | Hudson | 52/758 H |
| 3,736,035 | 5/1973 | Brown et al. | 52/758 H |

FOREIGN PATENTS OR APPLICATIONS 201,740  12/1954  Australia .................... 160/381

Primary Examiner—J. Karl Bell
Attorney, Agent, or Firm—Christel & Bean

[57] ABSTRACT

The invention relates to a corner key reinforcement brace for strengthening the joint between the beveled ends of abutting tubular metal members such as found in the frame of metallic storm or screen doors. The corner key is internally slip-fitted within each of the adjacent, abutting frame members in a manner so that a relatively close tolerance is maintained between the inner walls of both tubular members and the corner key. The corner key is formed of two substantially identical half sections having first and second leg portions disposed at substantially right angles to one another. All of the leg portions are substantially U-shaped in transverse cross section with one pair of corresponding legs having the top edges of the sidewalls thereof bent inwardly. Accordingly, the half sections are inverted with respect to one another and are engaged or mated together with the leg portion of each half section having inwardly flared sidewalls being received between the substantially straight sidewalls of a non-corresponding leg portion of the adjacent, inverted half section.

7 Claims, 8 Drawing Figures

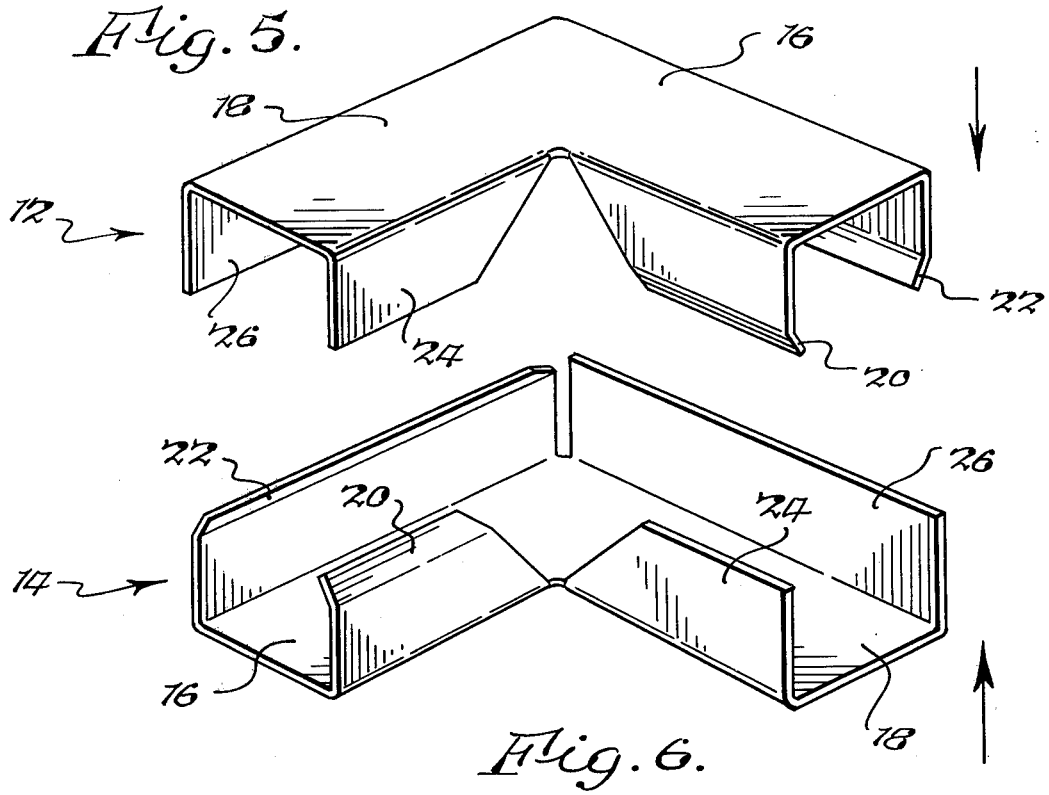
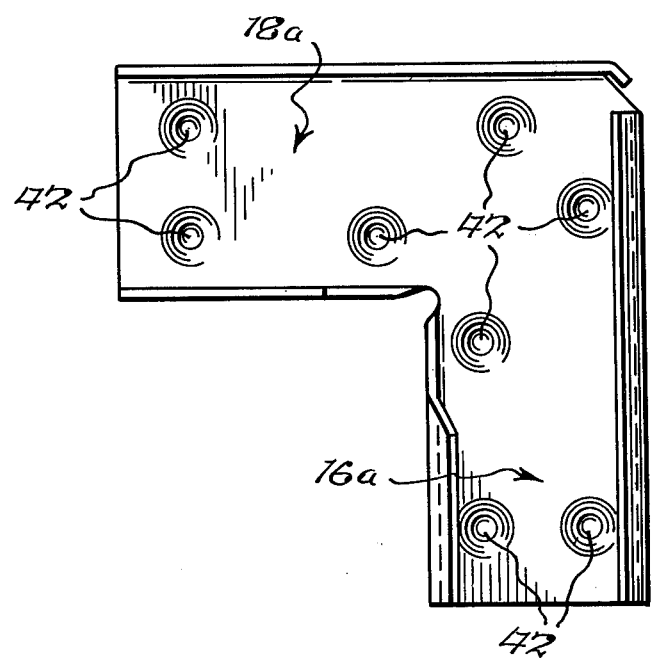
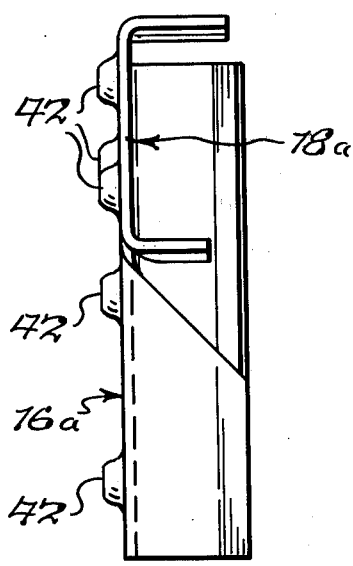

CORNER KEY REINFORCEMENT BRACE

BACKGROUND OF THE INVENTION

This invention relates to a corner brace for providing reinforcement between two similarly profiled tubular sections of a door frame, one adjoining the other at a mitre-angle of 45°. More specifically, the present invention relates to a corner key structure which is forceably received within the tubular end portion of each frame member so as to provide reinforcement to the joint formed thereby.

The present invention is particularly adaptable to assembly in tubular metallic door frames such as employed in the construction of screen and storm doors wherein such a frame is relatively large in size but yet must include a rigid connection at the four corner joints thereof so as to operate effectively and maintain a planar, rectangular shape.

One of the problems encountered in prior art door frames and other similar types of structural frames such as found in large window constructions formed of metallic tubular sections, resides in joining the corners such as by welding the abutting ends of such framing sections into corner joints. Necessarily, it is desirable to provide such frame structures with a planar profile and squared corners. However, welding tends to distort the structures through expansion and contraction (with consequent warping and twisting) during and after welding, and hence it is extremely difficult to achieve perfect flatness and rectilinear form in the finished product. Also, it is difficult to meet rigid requirements of fire regulations as potentially applicable to fire window constructions wherein the welded corner joints would have to resist deformation and failure under the heat of a fire. Furthermore, welding procedures are time consuming and expensive as well as dependent on the welder's skill for the only partially uniform degree of form accuracy that is possible to obtain in welded structures.

The prior art also has considered different types of bolt actuated expansion braces for tubular members and for corner structures specifically. However, such structures suffer from undue complexity and limited adaptability other than for those specific frames for which they are designed.

SUMMARY OF THE INVENTION

Accordingly, a primary object of the present invention is to provide a structural frame for a screen/storm door or the like from extruded tubular metal which includes mitred ends on the frame members thereof joined together at a corner wherein the frame members are so shaped as to internally receive the corner key of the present invention so that a strong, rigid corner is provided and wherein the aforesaid frame members are held securely against relative displacement, wobble or twist.

Another object of the present invention is to provide a corner key of the character specified which is light in weight, relatively small in dimension, and of a strong and rugged construction.

Another object of the present invention is to provide a corner key device which is easily adapted for assembly in a variety of tubular members.

Yet another object of the present invention is to provide a corner key formed of standardized, identical half-sections which are mated one to another and which are subsequently easily assembled within the abutting tubular sections of a door frame or similar structure.

In summary, the present invention provides a corner key reinforcing device for the corners of a tubular frame structure wherein the corner key includes substantially identical half sections formed of sheet metal which are easily engaged or mated one to another. The subassembled corner key includes two leg portions, each of which is generally rectangular in cross section, and being at substantially right angles with respect to one another are adapted to be snugly received within a tubular frame having a corresponding internal rectangular profile. The tubular frame sections engaged by each leg of the corner key include mitred ends which abut one another when each frame section is fully engaged with the corner key of the present invention. The corner key thereby forms a securely rigid, right angular extension on each frame section and thereby connects the abutting frame sections together in a rigid manner.

The foregoing and other objects, advantages, and characterizing features of the present invention will become clearly apparent from the ensuing detailed description of an illustrative embodiment thereof taken together with the accompanying drawings wherein like reference characters denote like parts throughout the various views.

BRIEF DESCRIPTION OF THE DRAWINGS

FIG. 5 is a perspective view of one of the half sections of the corner key constituting the present invention as viewed in inverted form prior to assembly with the half section disposed therebelow;

FIG. 6 is a perspective view of a second half section disposed in a upward disposition prior to assembly with the half sections shown in FIG. 5;

FIG. 7 is a side view in elevational of a modified half section adapted to form the corner key of the present invention which includes extruded protuberances extending outwardly from the bottom walls thereof to vary the mounting widths of the corner key; and FIG. 8 is an end view of the corner key half section shown in FIG. 7.

DETAILED DESCRIPTION OF THE ILLUSTRATIVE EMBODIMENT

Figure 1:
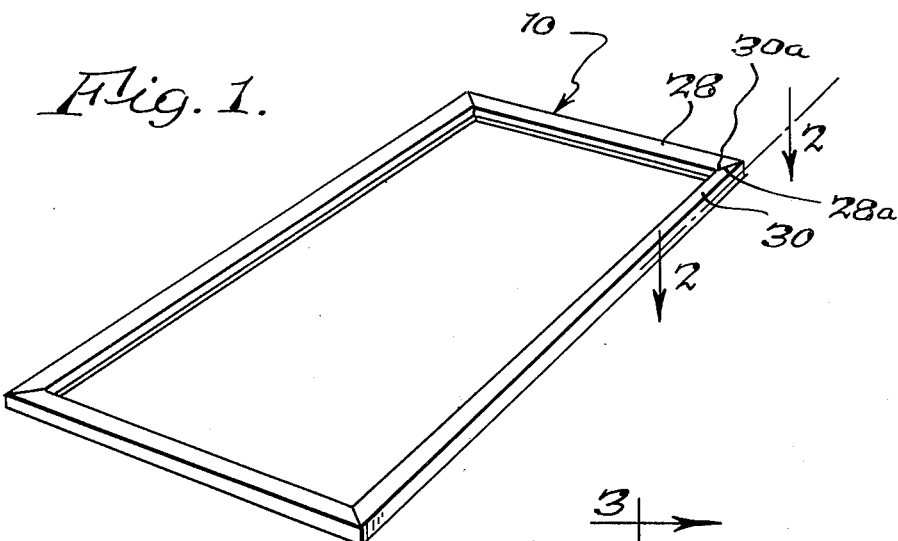
FIG. 1 is a perspective view of a door frame formed of extruded tubular metal sections having beveled ends which are joined together incorporating the corner key of the present invention.

Referring now in detail to the illustrative embodiment depicted in the accompanying drawings, there is shown in FIG. 1 a door frame generally indicated as 10 as used in screen or storm door constructions. However, it is within the scope of the present invention that the frame 10 and the assembly of the corner key constituting the present invention therein would be applicable in window constructions and other similar structures wherein sections of tubular frame are joined together in cornering fashion to form an integral frame.

Figure 3:
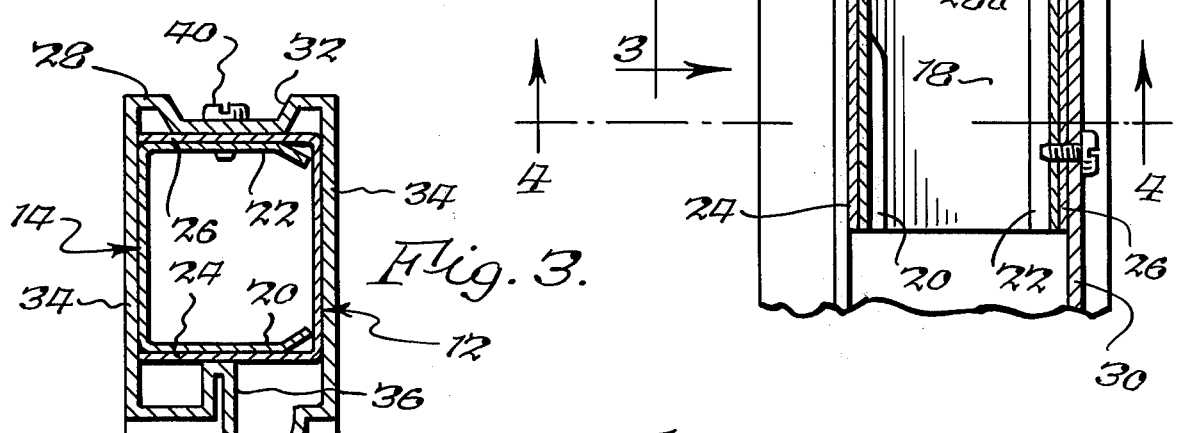
FIG. 3 is a fragmentary, transverse view in section taken about on line 3—3 of FIG. 2.
Figure 4:
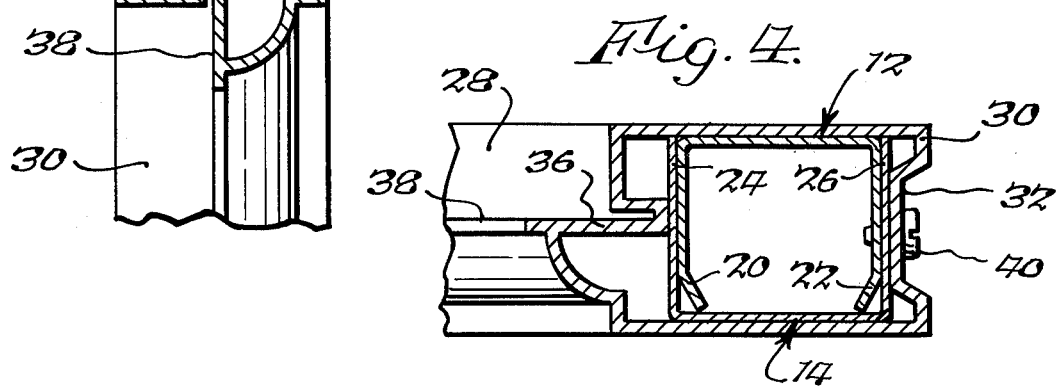
FIG. 4 is a fragmentary, transverse view taken about on line 4—4 of FIG. 2.

As shown in FIGS. 5 and 6 of the drawings, a pair of substantially identical half sections are shown and are indicated as 12 and 14, respectively. The half sections 12 and 14 are so formed as to be mated with one another to form a right angular corner brace of box like cross section as shown in FIGS. 3 and 4. The half section 12 includes a first leg portion 16 and a second leg portion 18 while the half section 14 shown in FIG. 6 of the drawings includes a similarly shaped first leg portion 16 and second leg portion 18. As shown in FIGS. 5 and 6 each half section is substantially U-shaped in transverse cross section and includes a pair of sidewalls with a bottom wall extending therebetween on each leg portion of each half section. As further shown in FIGS. 5 and 6, the leg portions of each half section are disposed at substantially right angles with respect to one another for cooperative assembly with a right angled corner of the aforesaid door frame. However, it is within the scope of the present invention that the angles between the leg portions of each half section could be varied or altered in the same degree so as to cooperatively be assembled within abutting tubular frame members which are not joined at right angles with respect to one another while still utilizing the inventive concept associated with the particular embodiment shown herein.

As shown in FIGS. 5 and 6, the upper or free longitudinal edges 20 and 22 of the first leg portions are bent or flared inwardly so as to facilitate engagement of their respectively associated side walls within the channel defined by the sidewalls 24 and 26 of the second leg portions. As it is to be appreciated by one skilled in the art, the sidewalls 20 and 22 of the first leg portions resiliently cam inwardly upon their forced insertion into the oppositely disposed channel formed by the sidewalls of the second leg portions of the adjacent half section mated therewith.

Figure 2:
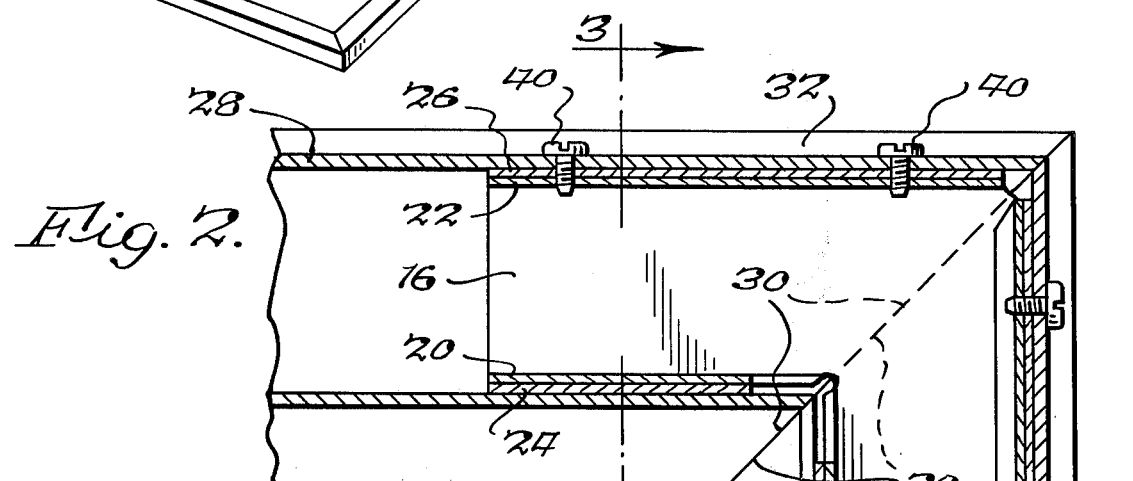
FIG. 2 is a plan view in section of a fully assembled corner key as taken about on line 2—2 of FIG. 1.

As shown in FIG. 2, a subassembled corner key including a pair of mated half sections 12 and 14 is received within the tubular end portions of frame members 28 and 30. The frame members 28 and 30 may be formed for example out of extruded aluminum and machined to include 45° mitred ends 28a and 30a which are adapted to abut one another to provide the right angular corner profile shown in FIG. 2. As further seen in FIG. 3, the frame member 38 is so formed to include an internal rectangular profile of appropriate dimension to receive a subassembled corner key in a minimum clearance, force fit type of manner. As shown in FIG. 3 the framing section 28 includes a peripheral groove 32 including a bottom wall which abuts one of the sidewalls of leg portion 12 of one of the corner key half sections. Accordingly, the side walls 34 of the framing member 28 are appropriately spaced to abut the outer surfaces of the bottom walls of the leg portions 12 and 14 while a stepped ridge portion 36 is formed in the lower portion of the tubular framing member to provide vertical abutment against the lower midportion of the corner key as seen in FIG. 3. In addition metal screws 40 are engaged through the bottom of groove 32 into the adjacent portion of the corner key.

As is to be further appreciated by one skilled in the art, a framed ledge surface 38 provided exteriorly of the tubular portion of the frame is adapted to receive an appropriate window or screen subassembly as is to be mounted in the frame 10 shown in FIG. 1.

FIG. 4 is a vertical cross sectional view looking upwardly along framing member 30. Its formation and assembled relationship to the corner key is essentially identical to the view shown in FIG. 3. As shown, a similar groove 32 is also provided in member 30 for the recessed insertion of metal screws 40 therethrough. As indicated in both FIGS. 3 and 4, the metal screws 40 extend through both sidewalls of the adjacent leg portions 12 and 14 so as to secure the respective framing members 28 and 30 in locked axial engagement with the respectively engaged sections of the corner key.

A modified form of the half sections is shown in FIGS. 7 and 8. As shown therein, the bottom walls of the first and second leg portions 16a and 18a respectively are provided with extruded protrusions 42. The protrusions 42 may be extruded to form an offset of selected length from the surface of the bottom walls of the aforesaid leg portions which in turn would engage the inner sidewalls of a tubular framing member such as the sidewalls 34 shown in FIG. 3. By use of the embodiment shown in FIGS. 7 and 8, the corner brace half sections for use in the present invention may be formed of uniform blanks having equal dimensions between the bottom wall and top edges of the sidewalls of the leg portions. By utilization of the protrusions 42, such standardized components of the corner key can be subsequently modified to be rigidly received within a tubular framing member having an inner dimension between its sidewalls greater than the dimension between the oppositely disposed bottom walls of the leg portions of a subassembled corner key.

In utilizing the corner key of the present invention an assembler of the door frames or similar structures described hereinabove would only need a supply of half section blanks such as 12 and 14 all of which would be substantially identical to one another. One would simply then have to subassemble two of the half sections by inverting one with respect to the other as shown in FIGS. 5 and 6 and urging such two half sections together into a resilient, force fitted engagement with respect to one another. Subsequent to the subassembly of the corner key or gusset-type structure, one mated leg portion of the key would be forced into the open end of a tubular framing member such as 38. Subsequent to this step, the second tubular framing member 30 is forced over the exposed leg portion of the corner key and is engaged along the length thereof until the mitred end edges 28a and 30a abut one another. Subsequent to such fitting of the framing members onto the corner key, an appropriate number of holes are drilled through the bottom wall of groove 32 of the framing members and into the adjacent sidewalls of the two half sections of the key. After engagement of metal screws in such holes, the framing members are axially locked onto the corner key and more maintained in a rigid relationship with respect to such key and with respect to one another. By means of the recessed nature of the bottom wall of groove 32, the heads of the metal screws 40 lie below the outer edge of the door and accordingly do not interfere with the effective operation thereof.

From the foregoing, it is apparent that the objects of the present invention have been fully accomplished. As a result of this invention, a significantly improved corner key for assembly with tubular framing members is provided for maintaining such framing members in a rigid, joined relationship at abutting end portions thereof. Through use of half sections which are substantially identical to one another, a corner key is provided which includes a simplified, inexpensive structure and which is easily subassembled and assembled with framing members to provide reinforcement therebetween in a highly effective manner.

We claim:

1. A brace adapted for reinforcing angularly connected tubular portions of a structural frame wherein the tubular portions of the frame are adapted to internally receive portions of said brace, said brace comprising:

a pair of half-sections substantially identical to one another, each said half-section including first and second leg portions, said leg portions being rigidly connected together in an angular disposition with respect to one another and each of said leg portions further being generally U-shaped in transverse cross-section so as to include a pair of upstanding sidewalls and a bottom wall extending between said pair of sidewalls with said bottom walls being substantially co-planar with respect to one another, and said half-sections being inverted and engaged with respect to one another so that said leg portions of one said half-section engage non-corresponding leg portions of the other said half-section wherein at least one sidewall of said first leg portion of each said half-section is bent inwardly of said first leg portion towards said opposite sidewall thereof so that both sidewalls of said first leg portion of each said half section are engaged in a resilient manner between said sidewalls of said second leg portion of said adjacent, inverted half-section engaged therewith.

2. A brace as set forth in claim 1 wherein at least one of said sidewalls of said first leg portion is bent upwardly along the top edge thereof towards said opposite sidewall thereof.

3. A brace as set forth in claim 2 wherein the top edges of both of said sidewalls of said first leg portion of each said half section are bent inwardly towards one another.

4. A brace as set forth in claim 3 wherein said leg portions of each said half section are connected together in a substantially right angular disposition so as to be adapted for reinforcing a substantially right angular corner of a structural frame.

5. A brace as set forth in claim 3 wherein said first and second leg portions of each said half section are connected together in a substantially right angular disposition and said brace is disposed within abutting, substantially right angular tubular portions of a structural frame so as to provide structural reinforcement thereto.

6. A corner key as set forth in claim 3 wherein each of said half sections include a plurality of formed protrusions extending outwardly of said bottom walls of said first and second leg portions thereof so as to provide shimmed support for mounting of said corner brace.

7. A combination as set forth in claim 5 wherein said adjoining tubular frame members adjoin one another at a miter-angle of substantially 45°.

* * * * *